United States Patent [19]
Lawrence et al.

[11] Patent Number: 5,164,963
[45] Date of Patent: Nov. 17, 1992

[54] CODING FOR DIGITAL TRANSMISSION

[75] Inventors: Victor B. Lawrence, Holmdel; Arun N. Netravali, Westfield; Jean-Jacques Werner, Holmdel, all of N.J.

[73] Assignee: AT&T Bell Laboratories, Murray Hill, N.J.

[21] Appl. No.: 611,225

[22] Filed: Nov. 7, 1990

[51] Int. Cl.$^5$ ............................................. H04N 5/40
[52] U.S. Cl. ........................................ 375/39; 358/13; 358/141; 371/43; 375/58
[58] Field of Search ................ 375/34, 39, 42, 58; 370/18, 21, 110.1, 110.4; 371/30, 43, 72; 358/13, 15, 142, 143

[56] References Cited

U.S. PATENT DOCUMENTS

| | | | |
|---|---|---|---|
| 3,909,721 | 9/1975 | Bussgang et al. | 375/57 |
| 4,644,537 | 2/1987 | Gitlin et al. | 375/39 |
| 4,651,320 | 3/1987 | Thapar | 370/119 |
| 4,823,346 | 4/1989 | Kobayashi et al. | 371/43 |
| 4,891,806 | 1/1990 | Farias et al. | 275/39 |
| 4,901,331 | 2/1990 | Calderbank et al. | 375/39 |
| 4,924,492 | 5/1990 | Gitlin et al. | 371/43 |
| 4,980,897 | 12/1990 | Decker et al. | 371/43 |

OTHER PUBLICATIONS

IEEE Transactions on Communications, vol. COM-26, No. 6, Jun. 1978, pp. 872-881. Sundberg, "Optimum Weighted PCM for Speech Signals".
IEE Proceedings, vol. 134, Pt F, No. 6, Oct. 1987, pp. 557-570, Sundberg et al "Logarithmic PCM Weighted QAM Transmission over Gaussian and Rayleigh Fading Channels".

*Primary Examiner*—Benedict V. Safourek
*Attorney, Agent, or Firm*—R. D. Slusky

[57] ABSTRACT

Digital signals, such as digitized television signals, are subjected to a source coding step followed by a channel mapping step. The source coding step causes the television signal to be represented by two or more data streams while, in the channel mapping step, the mapping is such that the data elements of the various data streams have differing probabilities of being erroneously detected at the receiver. In preferred embodiments, a first one of the aforementioned data streams carries components of the overall television signal which are regarded as the most important—for example the audio, the framing information, and the vital portions of the video information, such as motion compensation information—and that data stream is mapped such that its data elements have the lowest probability of error. A second one of the data streams carries components of the overall television signal which are regarded as less important than those of the first data stream and that data stream is mapped such that its data elements have a probability of error that is not as low as those of the first data stream. In general, it is possible to represent the overall television signal with any number of data streams, each carrying components of varying importance and each having respective probability of error. This approach allows a graceful degradation in reception quality at, for example, the television set location because as the bit error rate at the receiver begins to increase with increasing distance from the broadcast transmitter, the bits that represent proportionately less of the video information will be the first to be affected.

29 Claims, 5 Drawing Sheets

STANDARD 16-QAM (2,2;4) C-R MAPPED 16-QAM

STANDARD 64-QAM (2,2,2;6) C-R MAPPED 64-QAM (2,2;4) C-R MAPPED 16-QAM (1,2,1;4) C-R MAPPED 16-QAM (1,2;3) C-R MAPPED (1,2;3) TRELLIS-CODED C-R MAPPED

CODING FOR DIGITAL TRANSMISSION

BACKGROUND OF THE INVENTION

The present invention relates to the transmission of digital data, including, but not limited to, the transmission of digital data which represents television signals.

It is generally acknowledged that some form of digital transmission will be required for the next generation of television (TV) technology, conventionally referred to as high definition television, or HDTV. This requirement is due mostly to the fact that much more powerful video compression schemes can be implemented with digital signal processing than with analog signal processing. However, there has been some concern about getting committed to an all-digital transmission system because of the potential sensitivity of digital transmission to small variations in signal-to-noise ratio, or SNR, at the various receiving locations.

This phenomenon—sometimes referred to as the "threshold effect"—can be illustrated by considering the case of two television receivers that are respectively located at 50 and 63 miles from a television broadcast station. Since the power of the broadcast signal varies roughly as the inverse square of the distance, it is easily verified that the difference in the amount of signal power received by the television receivers is about 2 dB. Assume, now, that a digital transmission scheme is used and that transmission to the receiver that is 50 miles distant exhibits a bit-error rate of $10^{-6}$. If the 2 dB of additional signal loss for the other TV set translates into a 2 dB decrease of the SNR at the input of the receiver, then this receiver will operate with a bit-error rate of about $10^{-4}$. With these kinds of bit-error rates, the TV set that is 50 miles away would have a very good reception, whereas reception for the other TV set would probably be very poor. This kind of quick degradation in performance over short distances is generally not considered acceptable by the broadcasting industry. (By comparison, the degradation in performance for presently used analog TV transmission schemes is much more graceful.)

There is thus required a digital transmission scheme adaptable for use in television applications which overcomes this problem. Solutions used in other digital transmission environments—such as the use of a) regenerative repeaters in cable-based transmission systems or b) fall-back data rates or conditioned telephone lines in voiceband data applications—are clearly inapplicable to the free-space broadcast environment of television.

SUMMARY OF THE INVENTION

At the heart of our invention is the realization that a particular characteristic of prior art digital transmission systems is disadvantageous when carried over into, for example, the television transmission environment and that that characteristic lies at the crux of the problem. In particular, digital transmission systems have traditionally been engineered to provide about the same amount of protection against impairments to all the data elements—typically bits—that are transmitted over the communication channel. Such an approach is desirable when the digital transport mechanism is transparent to the user's data and no prior knowledge of the data's content is available—as is the case, for example, in voiceband data or digital radio applications. However, when all the bits are treated as equal, they are also all affected in the same way by changing channel conditions and the result may be catastrophic, as illustrated by the above example.

In accordance with the present invention, the shortcomings of standard digital transmission for over-the-air broadcasting of digital TV signals are overcome by a method comprising a particular type of source coding followed by a particular type of channel mapping—the latter being referred to herein as a catastrophe-resistant (C-R) mapping.

More specifically, the source coding step causes the television signal to be represented by two or more data streams while, in the channel mapping step, the mapping is such that the data elements of the various data streams have differing probabilities of being erroneously detected at the receiver. In preferred embodiments, a first one of the aforementioned data streams carries components of the overall television signal which are regarded as the most important—as discussed in further detail hereinbelow—and that data stream is mapped such that its data elements have the lowest probability of error. A second one of the data streams carries components of the overall television signal which are regarded as less important than those of the first data stream and that data stream is mapped such that its data elements have a probability of error that is not as low as those of the first data stream. In general, it is possible to represent the overall television signal with any number of data streams, each carrying components of varying importance and each having a respective probability of error. This approach allows a graceful degradation in reception quality at the TV set location because as the bit error rate at the receiver begins to increase with increasing distance from the broadcast transmitter, it will be the bits that represent the less important TV signal information that will be the first to be affected.

The invention is not limited to television signals but, rather, can be used in virtually any environment in which it is desired to provide different levels of error protection to different components of the intelligence being communicated.

DETAILED DESCRIPTION

Figure 1:
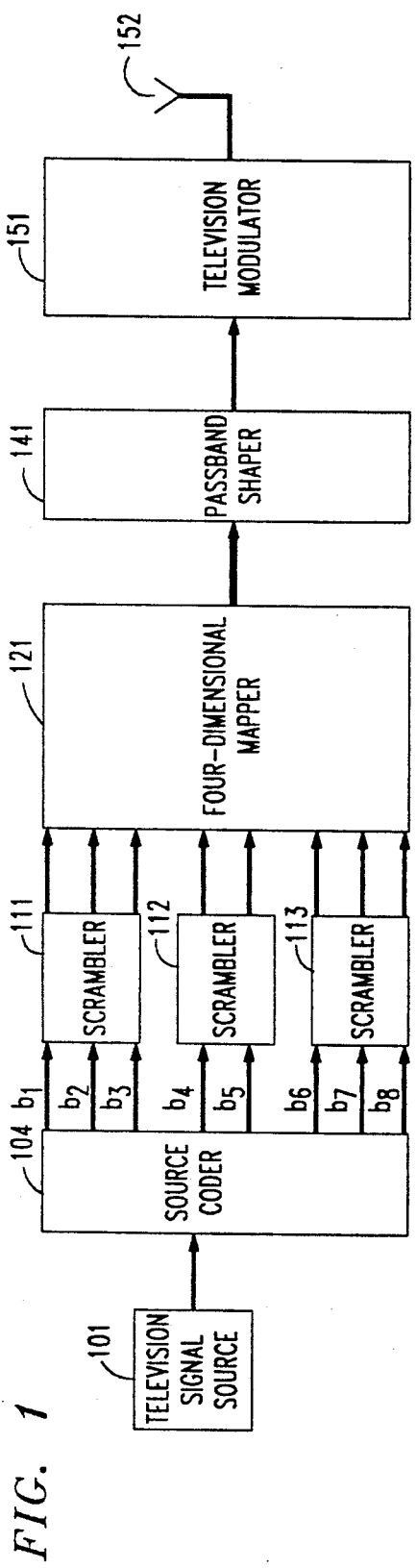
FIG. 1 is a block diagram of a transmitter embodying the principles of the invention, illustratively in the context of a four-dimensional channel mapping scheme for HDTV.
Figure 2:
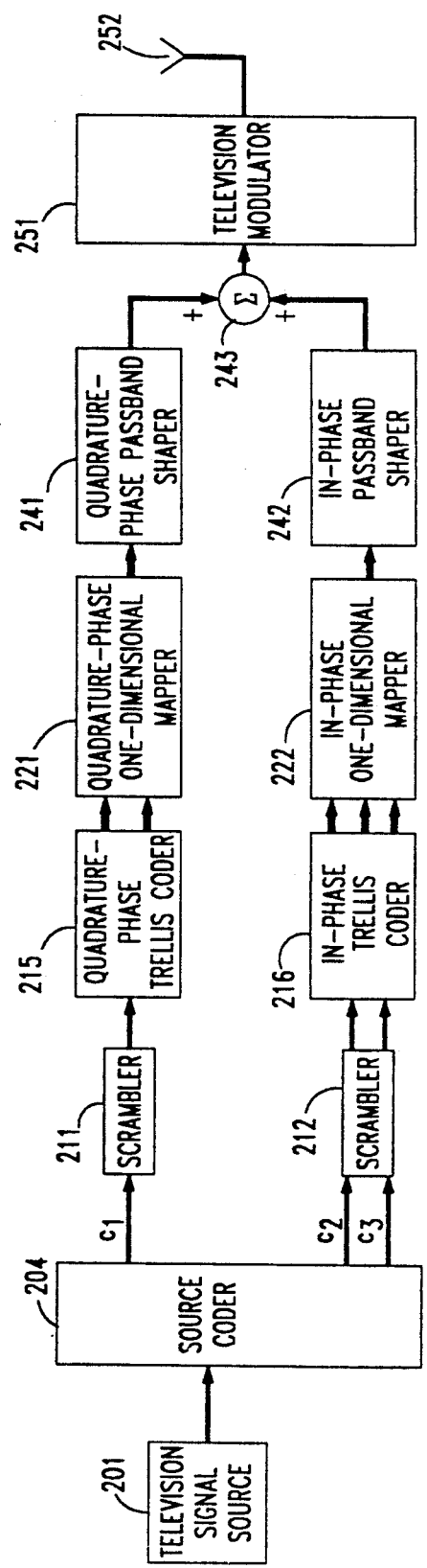
FIG. 2 is a block diagram of another transmitter embodying the principles of the invention in the context of a two-dimensional channel mapping scheme for HDTV, this scheme including trellis coding.
Figure 3:
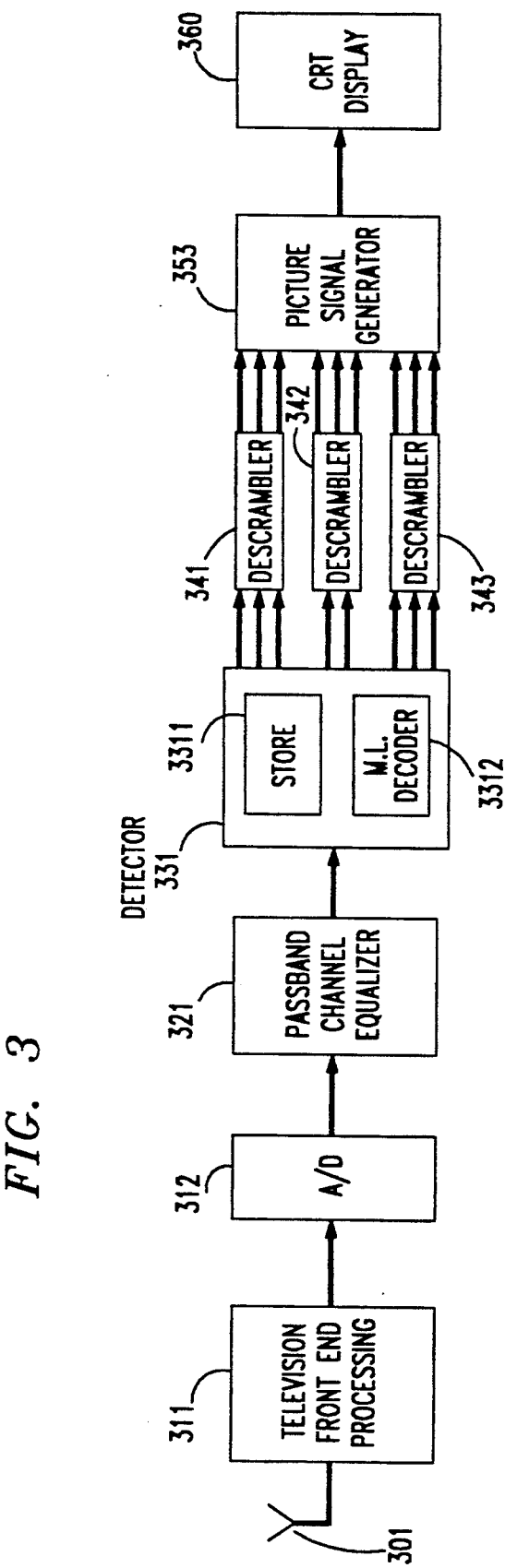
FIG. 3 is a block diagram of a receiver for transmitted signals transmitted by the transmitter of FIG. 1.

Before proceeding with a specific description of the transmitters of FIGS. 1 and 2 and the receiver of FIG. 3, it will be helpful to first consider the theoretical underpinnings of the invention.

First off, it should be noted that the various digital signalling concepts described herein (with the exception, of course, of the inventive concept itself) are all well known in, for example, the digital radio and voiceband data transmission (modem) arts and thus need not be described in detail herein. These include such concepts as multidimensional signalling using N-dimensional signal constellations, where N is some integer; trellis coding; scrambling; passband shaping; equalization; Viterbi, or maximum-likelihood, decoding; etc. These concepts are described in such U.S. Pat. Nos. as 3,810,021, issued May 7, 1974 to I. Kalet et al.; 4,015,222, issued Mar. 29, 1977 to J. Werner; 4,170,764, issued Oct. 9, 1979 to J. Salz et al.; 4,247,940, issued Jan. 27, 1981 to K. H. Mueller et al.; 4,304,962, issued Dec. 8, 1981 to R. D. Fracassi et al.; 4,457,004, issued Jun. 26, 1984 to A. Gersho et al.; 4,489,418, issued Dec. 18, 1984 to J. E. Mazo; 4,520,490, issued May 28, 1985 to L. Wei; and 4,597,090, issued Jun. 24, 1986 to G. D. Forney, Jr.—all of which are hereby incorporated by reference.

Figure 4:
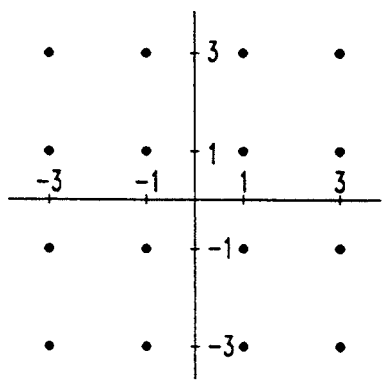
FIGS. 4-11 are signal constellation maps useful in explaining the principles of the invention.

Turning now to the drawing, FIG. 4 depicts a standard two-dimensional data transmission constellation of the type conventionally used in digital radio and voiceband data transmission systems. In this standard scheme—conventionally referred to as quadrature-amplitude modulation (QAM)—data words each comprised of four bits are each mapped into one of 16 possible two-dimensional signal points. The constellation is thus labelled "Standard 16-QAM". Each signal point has an in-phase, or I, coordinate on the horizontal axis and has a quadrature-phase, or Q, coordinate on the vertical axis. Note that, on each axis, the signal point coordinates are $\pm 1$ or $\pm 3$ so that the distance between each point and each of the points that are horizontally or vertically adjacent to it is the same for all points—that distance being "2".

(The process of mapping the data words into particular signal points is referred to herein as "channel mapping" and the signal points are sometimes referred to as "channel symbols".)

Figure 5:
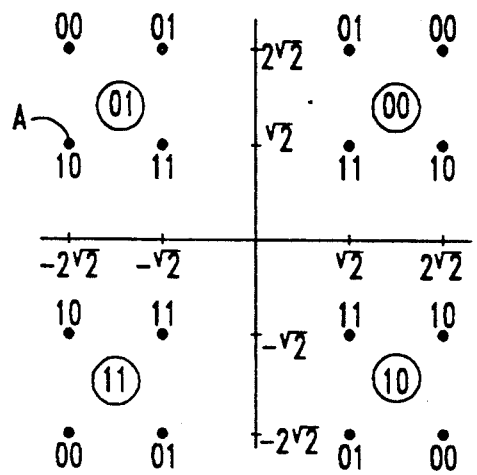

Now consider the 16-point constellation of FIG. 5, which embodies the principles of the invention. The difference between this constellation and that of FIG. 4 is the relative distance between the different signal points.

Specifically, since the distance between all the adjacent points in FIG. 4 is the same, essentially the same probability of error is provided for all the bits which the signal points represent. (Transmission errors arise when, as the result of noise, phase jitter and various other channel phenomena/impairments, a transmitted signal point is displaced from its original position in the constellation to such an extent that it appears at the receiver that a different signal point was transmitted.) On the other hand, the distance between adjacent points in FIG. 5 is not the same for all the points. Specifically, the minimum distance between points within a particular quadrant in FIG. 5 is $d=\sqrt{2}$, and the minimum distance between points in adjacent quadrants is twice this amount, that is $2d=2\sqrt{2}$. Thus, the probability of making an error in the receiver in identifying in which quadrant the transmitted point was located is smaller than the probability of making an error in identifying which point within that quadrant was the actual point. This results from the fact that the minimum distance between signal points representing different values of the data elements of the first data stream—e.g., the minimum distance ($2\sqrt{2}$) between the points in the first quadrant representing the first-stream dibit 00 from those in the second quadrant representing the first-stream dibit 01—is greater than the minimum distance between the signal points representing the different values of the data elements of the second data stream—e.g., the minimum distance ($\sqrt{2}$) between the point in the first quadrant representing the second-stream dibit 00 and the point in that same quadrant representing the second-stream dibit 01.

Assume now that two out of the four bits of each transmitted data word need more protection from error than the other two bits because they are more important than the other two bits. This is achieved in accordance with the invention by using those two, more important bits to select one of the four quadrants (as indicated by the circled dibits in FIG. 5), and using the other two bits to select one of the four points within each quadrant, as indicated by the dibits next to each point. Since the probability of not correctly identifying the quadrant of the transmitted signal point is smaller than the probability of not correctly identifying the signal point itself, the desired protection is thereby achieved.

More generally stated, the constellation is divided into groups of signal points and each group is divided into subgroups, each of the latter being comprised of one or more signal points. At least one data element, e.g., bit, from each data word to be mapped identifies the group from which is to come the signal point that is to represent that data word, and at least one other data element identifies the subgroup within that group. If the subgroup contains more than one signal point, then further data elements are used to ultimately identify a particular one of those signal points (to which end the subgroup may be further divided into sub-subgroups). In accordance with the invention, a) the groups and subgroups are arranged such that the probability of the receiver erroneously determining which group a transmitted signal point is from is less than the probability of the receiver erroneously determining which subgroup it is from, and b) the data elements that identify the group represent information that is more important than the information represented by data elements that identify the subgroup.

Figure 6:
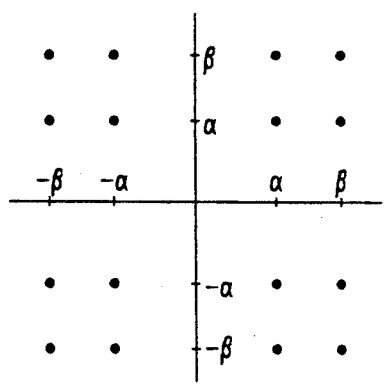
Figure 7:
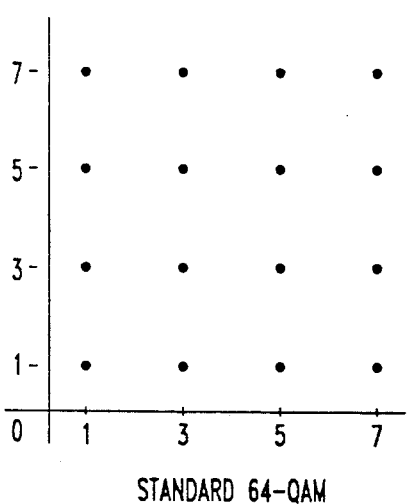
Figure 8:
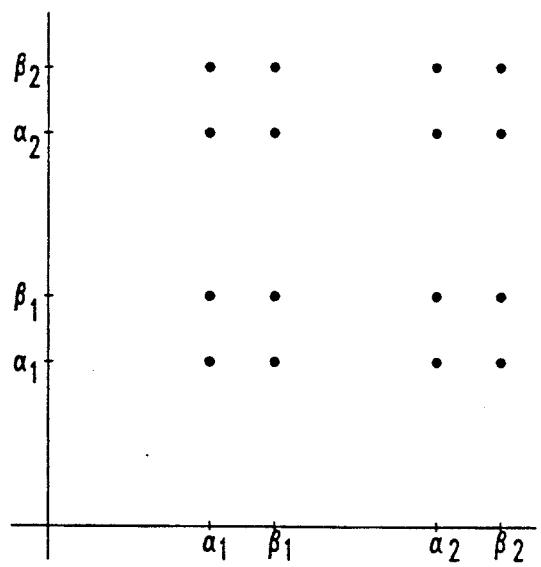

A generic version of the constellation of FIG. 5 is shown in FIG. 6 in which the coordinate values, instead of being at $\pm\sqrt{2}$ and $\pm 2\sqrt{2}$, are $\pm\alpha$ and $\pm\beta$. It will also be appreciated that the constellations are not limited to any particular size, i.e., number of signal points. For example, a standard 64-QAM constellation—represented by its upper right quadrant—is shown in FIG. 7, and a generic 64-point constellation embodying the principles of the invention and affording three different levels of protection is shown in FIG. 8.

Figure 9:
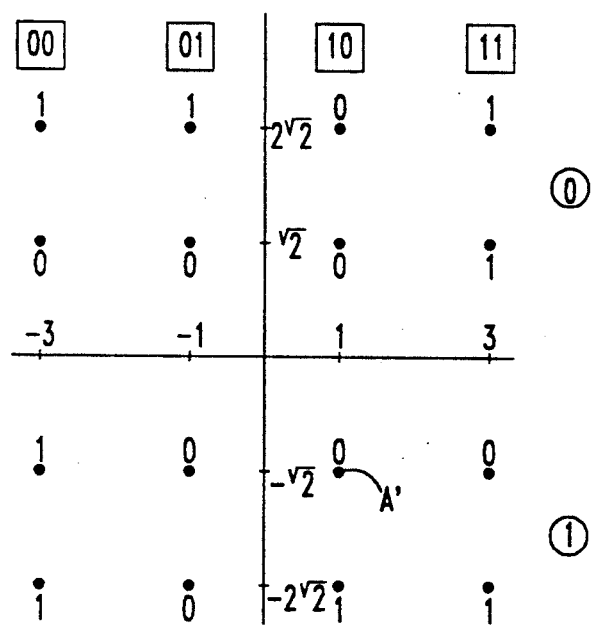

Before proceeding, it is useful to make some formal definitions. As noted above, channel mapping in accordance with the invention is referred to herein as catastrophe-resistant (C-R) mapping. In general, a ($n_1, n_2, \ldots, n_k$; m) C-R mapping will be a mapping that provides the first (best) level of protection to $n_1$ bits; the second level of protection to $n_2$ bits; and so forth. The last entry in the mapping identification is a reminder of the total number m of information bits that are transmitted, that is: $m = n_1 + n_2 + \ldots + n_k$. With this definition, each of the C-R mappings shown in FIGS. 5 and 6 is a (2, 2; 4) mapping, FIG. 8 is an example of a 64-point (2, 2, 2; 6) mapping (represented by its upper right quadrant); and an example of a 16-point (1, 2, 1; 4) mapping is shown in FIG. 9. Finally, notice that standard QAM mappings of the type shown in FIGS. 4 and 7 can be considered as (m; m) C-R mappings.

We now briefly discuss the kind of trade-offs that are possible in the design of C-R mappings. First, we will assume that the power in the transmitted signal is subject to an average power constraint. Let $a_i$ and $b_i$ denote the I and Q discrete signal point levels, and assume that these signal points are uncorrelated. The average power constraint then requires that $$\sum_i a_i^2 + \sum_i b_i^2 = \text{constant} \tag{1}$$

for all the signal point level scenarios under consideration. Now let $SNR_{ni}$ denote the amount of SNR required to achieve a certain performance for the bits with the $i^{th}$ level of protection. The change in the amount of SNR required by these bits to achieve that level of performance compared to a standard (m; m) mapping is then defined by $$\Delta SNR_{ni} = SNR_{ni} - SNR_m, \tag{2}$$

where $SNR_m$ is the amount of SNR required by the (m; m) mapping to achieve the same performance. (This is the mapping that provides the same amount of protection to all the bits.) With the expressions in (1) and (2), we get the following relationships for the (2, 2; 4) mapping shown in FIG. 6.

$$\beta = \sqrt{10 - \alpha^2} \quad \Delta SNR_{n1} = -20 \log_{10}(\alpha) \tag{3}$$

$$\Delta SNR_{n2} = -20 \log_{10} \frac{\beta - \alpha}{2},$$

where the incremental SNRs are expressed in dB. Using $\alpha$ in FIG. 6 as a parameter in (3), we can first determine the value of $\beta$ and then the incremental SNRs. Some computed values are given in Table I.

TABLE I

| | Trade-Offs for the (2, 2; 4) Mapping | | |
|---|---|---|---|
| $\alpha$ | $\beta$ | $\Delta SNR_{n1}$ | $\Delta SNR_{n2}$ |
| 1 | 3 | 0 | 0 |
| 1.1 | 2.965 | −0.83 | 0.61 |
| 1.2 | 2.926 | −1.58 | 1.28 |
| 1.3 | 2.883 | −2.28 | 2.03 |
| $\sqrt{2}$ | $2\sqrt{2}$ | −3 | 3 |
| 1.5 | 2.784 | −3.52 | 3.85 |
| 1.6 | 2.728 | −4.08 | 4.98 |

In order to give some meaning to the entries in Table I, we consider some specifics, such as the case $\alpha = \sqrt{2}$, which corresponds to the signal constellation shown in FIG. 5. The incremental SNRs for the two most protected bits are given in the third column. For the case under consideration, the incremental SNR for these bits is equal to −3 dB. Thus, for a given probability of error, these bits can tolerate an SNR that is 3 dB smaller than the SNR that would be required for a standard 16-point QAM system. On the other hand, as can be seen from the fourth column, the least protected bits would require three more dB of SNR in order to achieve the same performance as the standard QAM system.

The trade-off that has been achieved in the previous example may seem quite brutal: On one hand, we decrease the sensitivity to noise by 3 dB for the first two bits; and then, on the other hand, we increase this sensitivity by the same 3 dB for the other two bits. Such a clean trade-off rarely happens, as should be apparent from the other entries in Table I. For example, for $\alpha = 1.2$ more robustness against noise is gained by the most protected bits than is lost by the least protected bits. This is the kind of behavior to be sought in the design of efficient C-R mappings.

The invention is not limited to two-dimensional constellations but, indeed, can be implemented with N-dimensional constellations where $N \geq 2$. Indeed, an increase in the number of dimensions gives more flexibility in the design of efficient mappings. One way of implementing multidimensional C-R mappings with a QAM system is to use different two-dimensional C-R mappings in successive signal point intervals. As an example, a four-dimensional constellatin can be created by concatenating all of the possible two-dimensional signal points from the (2, 2; 4) mapping of FIG. 5 with all of the possible two-dimensional signal points from the (1, 2, 1; 4) mapping of FIG. 9, as explained hereinbelow.

It is easily shown that such a mapping procedure provides a (3,2,3;8) four-dimensional C-R mapping. Specifically, the greatest spacing between points in the constellation of FIG. 5 is the distance $2\sqrt{2}$, which is the smallest distance between the points in one quadrant and those in another. That same greatest spacing separates the upper and lower halves of the constellation of FIG. 9. Thus the highest level of protection can be achieved for three bits—two bits selecting a quadrant from the FIG. 5 constellation—as indicated by the circled dibits in FIG. 5—and a third bit selecting one of the two (upper and lower) halves of the constellation of FIG. 9—as indicated by the circled bits in FIG. 9. The next largest spacing is the distance between the columns in the constellation of FIG. 9, the smallest such distance being 2. Thus the second-highest level of protection is achieved for two bits, which select one of the four columns from the constellation of FIG. 9, as indicated by the squared-in dibits in FIG. 9. Finally, the smallest spacing is the distance $\sqrt{2}$ which, in the constellation of FIG. 5, is the smallest distance between the points within a quadrant and in the constellation of FIG. 9 is the smallest distance between the points within a column. Thus the lowest level of protection is again achieved for three bits—two bits selecting a point within the selected quadrant of the FIG. 5 constellation—as indicated by the dibits next to each point in FIG. 5—and a third bit selecting one of the two points contained within the selected half and selected column of the constellation of FIG. 9—as indicated by the single bit next to each point in FIG. 9.

It will thus be appreciated, by way of example, that the 8-bit word 01110100 would result in the selection of the four-dimensional signal point made up of the concatenation of point A from FIG. 5 and point A' from FIG. 9. Specifically, the first and second bits, 01, select the upper left quadrant of FIG. 5; the third bit, 1, selects the lower half of FIG. 9; the fourth and fifth bits, 10, select the second-from-right column of FIG. 9; the sixth and seventh bits, 10, select point A from the previously selected quadrant of FIG. 5; and the eighth bit, 0, selects point A' from the previously selected half and column of FIG. 9.

For this mapping, the SNR requirements for the two bits with the second level of protection are the same as the SNR requirements for the standard QAM signal constellation in FIG. 4. The three most protected bits and the three least protected bits have the SNR requirements that were derived in the previous section for the two-dimensional (2, 2; 4) mapping.

We are now in a position to consider the transmitter of FIG. 1.

Television signal source 101 generates an analog television signal which is passed on to source coder 104. The latter generates a digital signal in which at least one subset of the data elements represents information that is more important than the information represented by the rest of the data elements. Two examples of how such a signal might be generated are given hereinbelow.

The source-coded signal is illustratively C-R mapped, in accordance with the invention, using the four-dimensional mapping mentioned above in which each four-dimensional signal point is comprised of a two-dimensional signal point from the constellation of FIG. 5 concatenated with a two-dimensional signal point from the constellation of FIG. 9. In accordance with a feature of the invention, it has been recognized that it is desirable to preserve the distinctness of the bits which are to be accorded a particular level of protection by the mapping, notwithstanding any processing of the bits that may be necessary prior to their being mapped into four-dimensional signal points by four-dimensional mapper 121. Unless such distinctness is maintained, then, of course, it will not be possible to allocate the different levels of protection to the various data streams which represent the television signal.

In the present embodiment, in particular, it is desired to scramble the bits which comprise the digital signal in order to ensure a relatively uniform distribution of energy across the frequency band that the signal takes up. Accordingly, those bits are scrambled in three separate groups. Bits $b_1$, $b_2$ and $b_3$, which contain the most important information and are therefore to be accorded the highest level of protection, are scrambled by a first scrambler 111; bits $b_4$ and $b_5$, which contain the second-most-important information and are therefore to be accorded the second-highest level of protection, are scrambled by a second scrambler 112; and bits $b_6$, $b_7$ and $b_8$, which contain the least important amount of information and are therefore to be accorded the lowest level of protection, are scrambled by a third scrambler 113. (Scrambling is customarily carried out on a serial bit stream. Thus although not explicitly shown in FIG. 1, scramblers 111, 112 and 113 may be assumed to perform a parallel-to-serial conversion on their respective input bits prior to scrambling and a serial-to-parallel conversion subsequent thereto.)

The eight scrambled bits are applied in parallel in a four-dimensional mapper 121, mentioned above, which identifies a four-dimensional signal point to be generated using, for example, the bit-assignment scheme described above. Mapper 121 may be, for example, realized using table look-up. Conventional passband shaping and television modulation are then performed by passband shaper 141 and television modulator 151, respectively. The resultant analog television signal is then broadcast via antenna 152.

Turning now to the receiver of FIG. 3, the analog television signal is received by antenna 301, is subjected to conventional television front-end processing including, for example, demodulation in processing unit 311, and is converted to digital form by A/D converter 312. The signal is then equalized by passband channel equalizer 321 and passed on to detector 331. The latter stores, within store 3311, information relating to the mapping—specifically, information indicative of the positions of the signal points of the constellation and the manner in which they are divided into groups and subgroups—and performs a so-called "slicing" operation on the equalized signal in order to form decisions as to what the transmitted signal points were in response to the stored information. Apart from having knowledge about the way in which the constellations of FIGS. 5 and 9 are configured pursuant to the invention, the detector is otherwise standard. Maximum likelihood decoder 3312 shown as a part of detector 331 would not be used when the received signal is transmitted from the transmitter of FIG. 1, but only when transmitted from the transmitter of FIG. 2, as discussed below.

The 8-bit words output by detector 331 are descrambled by descramblers 341, 342 and 343, which respectively perform the inverse function of scramblers 111, 112 and 113 in the transmitter. A television signal formatted so as to be displayable by, for example, a CRT display is then generated from the descrambler outputs by picture signal generator 353. That signal is then applied to CRT display 360.

One more step of sophistication in the design of efficient C-R mappings can be achieved by adding redundancy to the signal constellations. Adding redundancy allows the usage of forward-error-correction coding, such as trellis coding. One of the issues with trellis coding is that its effect on the error rate of individual bits is not well understood. The published studies seem to have concentrated on the probability of error events, which is not easily related to the bit-error rate for trellis-coded systems. Nevertheless, even a simple example can show how more powerful C-R mappings can be obtained by using trellis coding.

Figure 10:
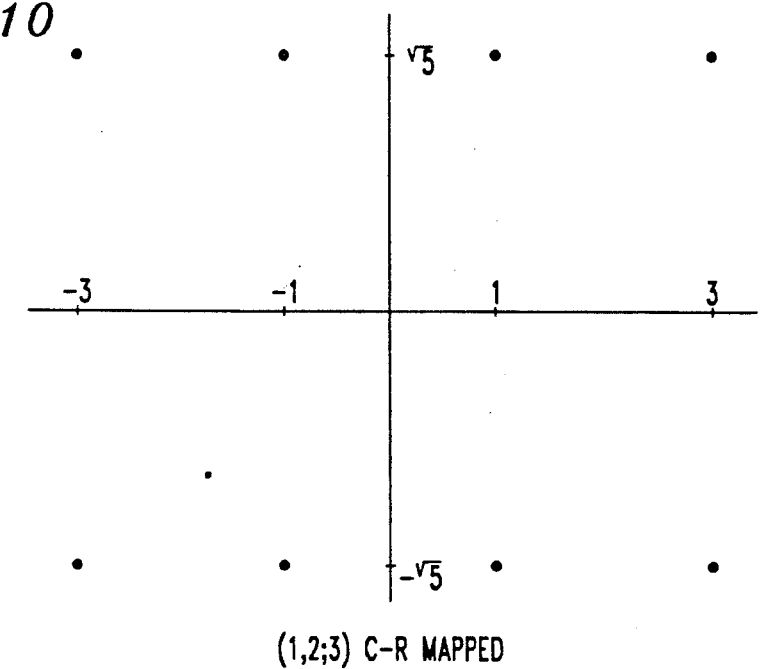

Assume that we want to transmit three bits per signal point, and that one of the bits requires much more protection than the other bits. For a non-trellis-coded system, this can be done by using a (1, 2; 3) C-R mapping that has the signal constellation shown in FIG. 10. The most important bit defines the upper or lower half plane, and the other two bits define one of four possible points in each half plane. It is easily verified that the most valuable bit has 7 dB more margin against noise than the other two bits. We now assume that independent one-dimensional trellis codes are used along each axis in FIG. 10, thereby, in practical effect, increasing the distance between the rows and, independently, the distance between the points within a row. This leads to the signal constellation shown in FIG. 11. Specifically, one of the three bits is trellis-coded to become two bits which select one of the four rows in FIG. 11, and the other two bits are trellis-coded independently of the first bit to become three bits which select one of the eight columns in FIG. 11.

Figure 11:
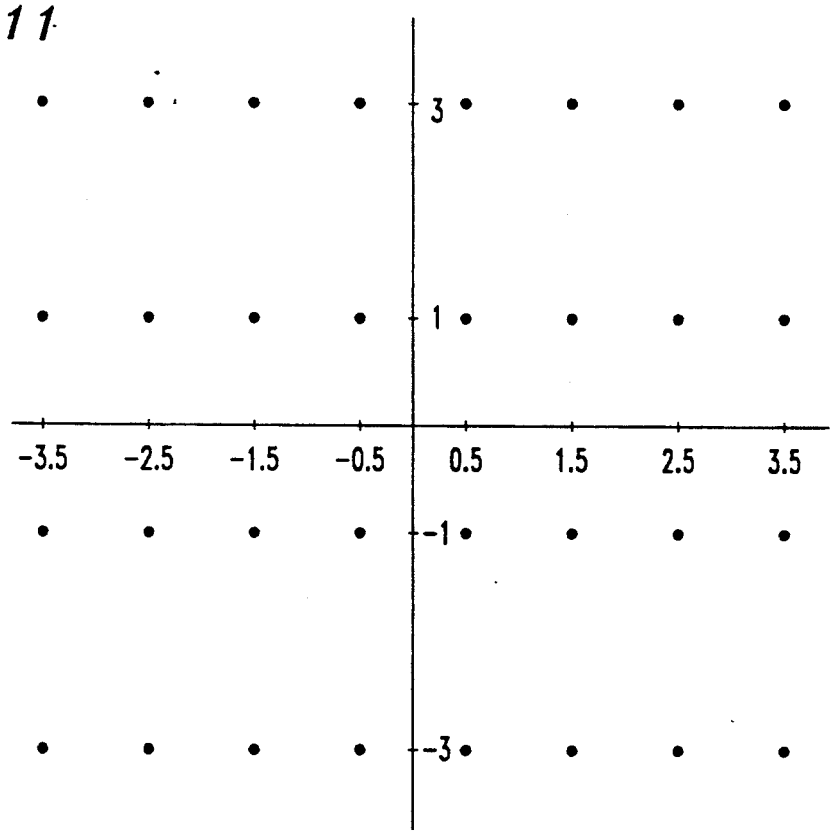

FIG. 2 shows a block diagram of a transmitter utilizing the constellation of FIG. 11. Television signal source 201 generates an analog television signal which is passed on to source coder 204. The latter generates a digital signal comprised of 3-bit binary data words $c_1$, $c_2$, $c_3$, in which it is assumed that bit $c_1$ is more important than the the other two bits $c_2$ and $c_3$. Bit $c_1$ is scrambled by a first scrambler 211, while bits $c_2$ and $c_3$ are scrambled by a second scrambler 212.

The output of scrambler 211 is trellis-encoded by quadrature-phase trellis coder 215, while the output of scrambler 212 is trellis-encoded by in-phase trellis coder 216. The 2-bit output of trellis coder 215 identifies one of the four rows of the FIG. 11 constellation, as described above. Those two bits are applied to quadrature-phase one-dimensional mapper 221, which generates an output identifying one of the four y-axis coordinates ±1, ±3. At the same time, the 3-bit output of trellis coder 216 identifies one of the eight columns of the FIG. 11 constellation. Those three bits are applied to in-phase one-dimensional mapper 222, which generates an output identifying one of the eight x-axis coordinates ±0.5, ±1.5, ±2.5 and ±3.5. Conventional passband shaping is then performed by quadrature-phase passband shaper 241 and in-phase passband shaper 242, whose outputs are combined in an adder 243. The resulting combined signal is then applied to television modulator 251, whose output analog signal is broadcast via antenna 252.

A specific receiver for the signal generated by the transmitter of FIG. 2 is not shown. Those skilled in the art will, however, be readily able to design such a receiver using standard building blocks similar to those used in FIG. 3, although in this case the detector stage preferably includes a maximum likelihood, or Viterbi, decoder 3312 in order to take advantage of the coding gain afforded by the trellis codes.

With this kind of trellis coding, we can decrease the sensitivity to noise by 3 dB for all the bits. For a probability of error of $10^{-6}$, the most important bit then requires an SNR of about 11 dB, and the other two bits require an SNR of about 18 dB. (For simplicity, we assume here that the channel has a flat amplitude response.) If standard 8-point uncoded and 16-point trellis-coded signal constellations were utilized instead, the SNR requirements would be 18 dB and 15 dB, respectively, for the same error rate. Designs for trellis-coded C-R mappings that are directly carried out in a multidimensional space should be even more powerful.

Reference may also be made to the co-pending, commonly-assigned patent application by L. Wei entitled "Coded Modulation With Unequal Error Protection," Ser. No. 611,200 filed of even date herewith, now U.S. Pat. No. 5,105,442, issued Apr. 14, 1992, which discloses further trellis-coded modulation schemes useful in these applications.

Finally, two examples of how one might generate a television signal of the type described above will now be presented.

One approach is to perform a two-dimensional block transform on the signal—using, for example, a discrete cosine transform—to generate for each block of m-by-m picture elements (pixels or pels) a matrix of $m^2$ coefficients. These coefficients are then arranged according to their importance. "Important" coefficients, in this context, are determined by taking into account two factors—the amount of energy in the coefficient (more energy means more importance) and the perceptual importance of the various coefficients. The perceptual importance, in particular, can be determined by taking into account any number of well-known phenomena relative to the human perception of video images. For example, it is well known that a) high-frequency coding degradations are less perceptible to the viewer than low-frequency, b) blurred pictures do not appear as degraded as pictures with a great deal of granular noise, c) positions of edges are more important than non-edges in that any slight shift in the former is easily noticeable, etc. Specifically, one can devise a weighted function of the coefficient values, with higher weights being given to coefficients which a) by virtue, for example, of their location in the matrix are identified as containing low-frequency information; b) by virtue of their relationships with other coefficients can be identified as containing edge information; etc.

The value of the aforementioned function, evaluated for each coefficient, is then used as the basis for putting the coefficients into, for example, four categories—high importance, medium importance, low importance and not important. Specifically, coefficients above a first, highest threshold are put into the high importance category. Coefficients between that first threshold and a second, lower threshold are put into the medium importance category, and so forth. Coefficients in the fourth category are simply dropped, leaving three categories of coefficients to code—corresponding to, for example, the illustrative embodiment of FIG. 1. Coefficients in the first category are quantized finely, those in the second category less finely, i.e., with fewer bits per coefficient, and in the third category even less finely, i.e., with even fewer bits per coefficient. (This utilization of different quantization levels for the various categories is not necessary to achieve the advantages of the invention in terms of providing better protection against channel-induced error, but does provide a more advantageous coding of the picture information itself.)

The number of coefficients for which the weighted function value falls into a particular range of values will depend on the characteristics of the frame in question. However, one can assure a fixed number of coefficients—and thus a fixed number of bits in each category—by dynamic reassignment of the coefficients into the various categories by, for example, dynamically changing the aforementioned threshold values. (Information specifying which coefficients have been put into which categories would have to be communicated to the receiver as some form of "side" information.")

In accordance with a second possible scheme, temporal redundancy is removed first by computing a motion compensated prediction error in well-known fashion. The error is then processed by a two-dimensional m-by-m transform as in the first approach. The transform coefficients are once again arranged in order of importance and then divided into categories, each having its respective level of quantization. There could be, for example, only three categories—most important, less important and not important. Dropping the latter leaves two categories, corresponding, for example, to the illustrative embodiment of FIG. 2. The more important coefficients would not only be transmitted, but also used in the motion compensated DPCM coder loop (after being inversely transformed) in standard fashion. The less important coefficients would not be used in that loop.

For either of these, or other, schemes, there is other information that needs to be transmitted that would typically be regarded as being in the "most important" category. Such information—which would typically be multiplexed or otherwise combined with the bit stream which represents the most important picture information—would include, for example, framing information and audio, as well as the aforementioned "side information."

The foregoing merely illustrates the principles of the invention. For example, the invention is illustrated herein in the context of a digital TV transmission system. However, it is equally applicable to other types of digital transmission systems. Moreover, although particular constellations are shown herein, numerous other constellations, which may be of any desired dimensionality, can be used. For example, the various constituent two-dimensional C-R mappings that are used to provide higher-dimensional, e.g., four-dimensional, mappings may be used in unequal proportions. Alternatively, signal constellations with a different number of points may also be used in successive signal point intervals. All these possibilities provide a great flexibility for the design of efficient multidimensional C-R mappings. Additionally, it should be pointed out that four dimensions are naturally available in HDTV applications because of the possibility of using horizontal and vertical polarizations at the same time. Theoretically, this allows the simultaneous transmission of two independent QAM signals. Thus, for this application, there is an opportunity to implement multidimensional C-R mappings both in time (over different signal point periods) and in space (between polarizations).

Additionally, although a particular type of source coding is used in the illustrative embodiment hereof, it is envisioned that various other approaches to the digital representation of the television signal, i.e., other types of source coding, can be employed in order to give more protection to some of the transmitted bits. Such approaches might include the use of, for example, trellis/convolutional codes, BCH codes, Reed-Solomon codes, and/or concatenations of same. Disadvantageously, some channel mapping schemes may expand the bandwidth of the transmitted signal or may have potential synchronization problems, and may not be cost effective. In any case, if these problems can be resolved, the present invention can always be combined with any such approachs since the latter operate on the bit stream. Also, it is envisioned that the source coding may well include other types of processing, such as any of various forms of television signal compression.

It may also be noted that although the invention is illustrated herein as being implemented with discrete functional building blocks, e.g., source coders, scramblers, etc., the functions of any one or more of those building blocks can be carried out using one or more appropriate programmed processors, digital signal processing (DSP) chips, etc.

It will thus be appreciated that those skilled in the art will be able to devise numerous and various alternative arrangements which, although not explicitly shown or described herein, embody the principles of the invention and are within its spirit and scope.

We claim:

1. A method for communicating television information comprising the steps of
   generating a digital signal representing the television information, the digital signal being comprised of at least first and second data streams of data elements,
   channel mapping the digital signal, and
   transmitting the mapped signal over a communication channel,
   the mapping step being such that the probability of channel-induced error for the data elements of the first data stream is less than the probability of channel-induced error for the data elements of the second data stream,
   the mapping step comprising the step of
   selecting a sequence of signal points from a predefined constellation of signal points to represent the data elements, the constellation being such that the minimum distance between signal points representing different values of the data elements of said first data stream is greater than the minimum distance between signal points representing the different values of the data elements of said second data stream.

2. The invention of claim 1 wherein said mapping step includes the step of trellis coding the digital signal.

3. The invention of claim 1 wherein said generating step includes the steps of
   receiving the information, and
   source coding the information using a predetermined source code.

4. The invention of claim 1 wherein said constellation is an N-dimensional constellation, where $N \geq 2$.

5. The invention of claim 1 wherein said generating step includes the steps of
   receiving the information, and
   source coding the information using a predetermined source code.

6. The invention of claim 5 wherein said generating step includes the further step of processing the source-coded information using at least a first predetermined processing algorithm, said processing being carried out for the data elements of said first data stream independently of the processing carried out for the data elements of said second data stream.

7. A method for use in a digital transmission system of the type in which signal points from a predetermined signal point constellation representing respective associated data words are communicated from said transmitter over a communication channel to a receiver, said data words being comprised of individual data elements, said method comprising the steps of
   identifying, in response to at least one of the data elements of each said data word, which particular one of said groups includes the signal point associated with said data word and, in response to at least one other of the data elements of that word, which particular one of the subgroups within said particular group includes the signal point associated with said data word, said constellation being divided into groups of signal points, each of said groups being divided into subgroups of signal points, and said groups and subgroups being arranged such that the probability of said receiver erroneously determining which group a transmitted signal point is from is less than the probability of said receiver erroneously determining which subgroup it is from, and
   generating a signal representing a signal point from the identified subgroup and applying that signal to said communication channel.

8. The invention of claim 7 further characterized in that the data elements that are used to identify said particular group represent more important information than the data elements that identify said particular subgroup.

9. The invention of claim 7 wherein said information includes television signal information.

10. The invention of claim 7 wherein said data words are trellis encoded data words.

11. The invention of claim 7 wherein said constellation is an N-dimensional constellation, where $N \geq 2$.

12. Apparatus for communicating television information, comprising
   means for generating a digital signal representing the television information, the digital signal being comprised of at least first and second data streams of data elements,
   means for mapping the digital signal, and means for transmitting the mapped signal over a communication channel, the mapping means being such that the probability of channel-induced error for the data elements of the first data stream is less than the probability of channel-induced error for the data elements of the second data stream, said digital signal generating means including means for receiving the information, and means for source coding the information using a predetermined source code, and said mapping means including means for selecting a sequence of signal points from a predefined constellation of signal points to represent the data elements, the constellation being such that the effective minimum distance between signal points representing different values of the data elements of said first data stream is greater than the effective minimum distance between signal points representing the different values of the data elements of said second data stream.

13. The invention of claim 12 wherein said generating means further includes means for processing the source-coded information using at least a first predetermined processing algorithm, said processing being carried out for the data elements of said first data stream independently of the processing carried out for the data elements of said second data stream.

14. The invention of claim 12 wherein said constellation is an N-dimensional constellation, where $N \geq 2$.

15. The invention of claim 12 wherein said mapping means includes means for trellis encoding the digital signal.

16. Apparatus for use in a digital transmission system of the type in which signal points from a predetermined signal point constellation representing respective associated data words are communicated from said transmitter over a communication channel to a receiver, said data words being comprised of individual data elements, said apparatus including means responsive to at least one of the data elements of each said data word for identifying which particular one of said groups includes the signal point associated with said data word and responsive to at least one other of the data elements of that word for identifying which particular one of the subgroups within said particular group includes the signal point associated with said data word, said constellation being divided into groups of signal points, each of said groups being divided into subgroups of signal points, and said groups and subgroups being arranged such that the probability of said receiver erroneously determining which group a transmitted signal point is from is less than the probability of said receiver erroneously determining which subgroup it is from, and means for generating a signal representing a signal point from the identified subgroup and for applying that signal to said communication channel.

17. The invention of claim 16 further characterized in that the data elements that identify said particular group represent more important information than the data elements that identify said particular subgroup.

18. The invention of claim 16 wherein said information is television signal information.

19. The invention of claim 16 wherein said data words are trellis encoded data words.

20. The invention of claim 16 wherein said constellation is an N-dimensional constellation, where $N \geq 2$.

21. An arrangement for use in a receiver which receives television intelligence communicated to said receiver by a transmitter, said transmitter including apparatus for a) generating a digital signal representing the television intelligence, the digital signal being comprised of at least first and second data streams of data elements; b) channel mapping the digital signal using a predetermined signal constellation, said mapping including the selecting of a sequence of signal points from a predefined constellation of signal points to represent the data elements, the constellation being such that the minimum distance between signal points representing different values of the data elements of said first data stream is greater than the minimum distance between signal points representing the different values of the data elements of said second data stream; and c) transmitting the mapped signal over a communication channel to the receiver, said mapping being such that the probability of channel-induced error for the data elements of the first data stream is less than the probability of channel-induced error for the data elements of the second data stream, said arrangement comprising means for receiving the transmitted signal, and means for storing information relating to said signal constellation and for recovering said intelligence from the received signal in response to said stored information, the stored information being indicative of the positions of the signal points of said constellation.

22. The invention of claim 21 wherein said mapping includes trellis coding of the digital signal and wherein said storing and recovering means includes a maximum-likelihood decoder.

23. The invention of claim 21 wherein said mapping includes the selecting of a sequence of signal points from a predefined constellation of signal points to represent the data elements and wherein said stored information is indicative of the positions of the signal points of said constellation.

24. The invention of claim 23 wherein said constellation is an N-dimensional constellation, where $N \geq 2$.

25. A method for use in a receiver of a digital transmission system, said system being of a type in which signal points selected from a predetermined signal point constellation to represent respective associated data words are communicated from said transmitter over a communication channel to a receiver, said data words being comprised of individual data elements, said constellation being divided into groups of signal points and each of said groups being divided into subgroups of signal points, and said signal points having been selected by a) identifying, in response to at least one of the data elements of each said data word, which particular one of said groups includes the signal point associated with said data word and, in response to at least one other of the data elements of that word, which particular one of the subgroups within said particular group includes the signal point associated with said data word, and b) generating a signal representing a signal point from the identified subgroup and applying that signal to said communication channel, said groups and subgroups being arranged such that the probability of said receiver erroneously determining which group a transmitted signal point is from is less than the probability of said receiver erroneously determining which subgroup it is from, said method comprising the steps of
receiving the transmitted signal points, and
recovering from the received signal points the data words represented thereby, said recovering being carried out in response to information stored, in said receiver, about said constellation and the manner in which it is divided into said groups and subgroups.

26. The invention of claim 25 further characterized in that the data elements that are used to identify said particular group represent more important intelligence than the data elements that identify said particular subgroup.

27. The invention of claim 25 wherein said information is television signal information.

28. The invention of claim 25 wherein said data words are trellis encoded data words.

29. The invention of claim 25 wherein said constellation is an N-dimensional constellation, where $N \geq 2$.

* * * * *